(12) United States Patent
Yokomizo et al.

(10) Patent No.: US 12,459,187 B2
(45) Date of Patent: Nov. 4, 2025

(54) EXTRUDER AND METHOD OF MANUFACTURING RESIN PRODUCT

(71) Applicant: THE JAPAN STEEL WORKS, LTD., Tokyo (JP)

(72) Inventors: Kazuya Yokomizo, Tokyo (JP); Yohei Fukuzawa, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 169 days.

(21) Appl. No.: 18/272,586

(22) PCT Filed: Oct. 13, 2021

(86) PCT No.: PCT/JP2021/037885
§ 371 (c)(1),
(2) Date: Jul. 16, 2023

(87) PCT Pub. No.: WO2022/168373
PCT Pub. Date: Aug. 11, 2022

(65) Prior Publication Data
US 2024/0116235 A1   Apr. 11, 2024

(30) Foreign Application Priority Data

Feb. 2, 2021   (JP) .................................. 2021-014742

(51) Int. Cl.
*B29C 48/92*   (2019.01)
*B29C 48/68*   (2019.01)
(Continued)

(52) U.S. Cl.
CPC .............. *B29C 48/92* (2019.02); *B29C 48/68* (2019.02); *B29C 48/69* (2019.02); *B29C 48/695* (2019.02);
(Continued)

(58) Field of Classification Search
None
See application file for complete search history.

(56) References Cited

U.S. PATENT DOCUMENTS

| 4,213,747 A | 7/1980 | Friedrich |
| 5,974,866 A | 11/1999 | Tjahjadi et al. |

(Continued)

FOREIGN PATENT DOCUMENTS

| JP | S54-78762 A | 6/1979 |
| JP | S6234532 B2 | 7/1987 |

(Continued)

OTHER PUBLICATIONS

Toda Naoki H05329864 English Translation 1993 (Year: 1993).*

(Continued)

*Primary Examiner* — Jacob T Minskey
*Assistant Examiner* — Adrien J Bernard
(74) *Attorney, Agent, or Firm* — Potomac Law Group, PLLC (57) ABSTRACT

An extruder includes a cylinder 2 and a die 5 attached to the cylinder 2. The die 5 has a resin flow path portion 22 to which a molten resin is supplied from the cylinder 2 and a hole 21 which is connected to the resin flow path portion 22 and from which the molten resin is discharged. The extruder further includes a pressure measurement unit 31 configured to measure a pressure of the molten resin in the cylinder 2 or the die 5 and a calculation unit configured to calculate a viscosity of the molten resin based on a measured value of the pressure measurement unit 31.

11 Claims, 8 Drawing Sheets

(51) Int. Cl.
  *B29C 48/69* (2019.01)
  *B29C 48/695* (2019.01)
(52) U.S. Cl.
  CPC ............... *B29C 2948/92019* (2019.02); *B29C 2948/922* (2019.02); *B29C 2948/924* (2019.02); *B29C 2948/92409* (2019.02)

(56) References Cited

U.S. PATENT DOCUMENTS

| | | | |
|---|---|---|---|
| 7,143,637 B1 | 12/2006 | McBrearty et al. | |
| 2004/0032040 A1 | 2/2004 | Harris | |
| 2017/0173838 A1 | 6/2017 | Takeuchi | |
| 2018/0022007 A1* | 1/2018 | Durand | B29C 48/402 264/40.1 |

FOREIGN PATENT DOCUMENTS

| | | |
|---|---|---|
| JP | H01292233 A | 11/1989 |
| JP | H05281128 A | 10/1993 |
| JP | H05329864 A | 12/1993 |
| JP | 2003121330 A | 4/2003 |
| JP | 2003262579 A | 9/2003 |
| JP | 2005349794 A | 12/2005 |
| JP | 2016007819 A | 1/2016 |
| JP | 2019027959 A | 2/2019 |
| WO | 9614930 A2 | 5/1996 |

OTHER PUBLICATIONS

International Search Report for International Patent Application No. PCT/JP2021/037885, Dec. 28, 2021.
Office Action issued Jun. 25, 2024, in Japanese Patent Application No. 2021-014742.
Extended European Search Report and European Search Opinion issued Nov. 25, 2024, in European Patent Application No. 21924760.8.
Office Action issued Apr. 7, 2025, in Taiwanese Patent Application No. 110136863.

* cited by examiner

EXTRUDER AND METHOD OF MANUFACTURING RESIN PRODUCT

TECHNICAL FIELD

The present invention relates to an extruder and a method of manufacturing a resin product.

BACKGROUND ART

Japanese Unexamined Patent Application Publication No. 2016-7819 (Patent Document 1) describes a technique related to a strand manufacturing apparatus including an extruder.

RELATED ART DOCUMENTS

Patent Documents

Patent Document 1: Japanese Unexamined Patent Application Publication No. 2016-7819

SUMMARY OF THE INVENTION

Problems to be Solved by the Invention

It is possible to manufacture a resin product, for example, resin pellets, by using the resin extruded from an extruder. In order to manage the quality of the manufactured resin pellets, it is necessary to check whether the quality is stable by periodically extracting the manufactured resin pellets and measuring the viscosity thereof. However, it is troublesome to periodically extract the manufactured resin pellets to measure the viscosity thereof, which makes the quality management of the resin pellets difficult and increases the manufacturing cost of the resin pellets. For this reason, it is desired to make it easier to manage the quality of the resin product manufactured by using the resin extruded from the extruder.

Other problems and novel features will be apparent from the descriptions of this specification and accompanying drawings.

Means for Solving the Problem

According to one embodiment, an extruder includes a cylinder, a die having a hole to discharge a molten resin, a pressure measurement unit configured to measure a pressure of the molten resin in the cylinder or the die, and a calculation unit configured to calculate a viscosity of the molten resin based on a measured value of the pressure measurement unit.

According to one embodiment, a method of manufacturing a resin product includes a step of (a) preparing an extruder including a cylinder and a die attached to the cylinder and a step of (b) supplying a resin material into the cylinder to form a molten resin and discharging the molten resin from a hole of the die. The method of manufacturing a resin product further includes a step of (c) measuring a pressure of the molten resin in the cylinder or the die and a step of (d) calculating a viscosity of the molten resin based on the pressure of the molten resin measured in the step (c).

Effects of the Invention

According to one embodiment, it becomes easy to manage the quality of the resin product manufactured by using the resin extruded from the extruder.

DETAILED DESCRIPTION OF PREFERRED EMBODIMENTS

Hereinafter, an embodiment will be described in detail with reference to drawings. Note that the members having the same function are denoted by the same reference characters throughout the drawings for describing the embodiment, and the repetitive description thereof will be omitted. Further, in the following embodiment, the description of the same or similar part will not be repeated in principle unless particularly required.

Embodiment

Figure 1:
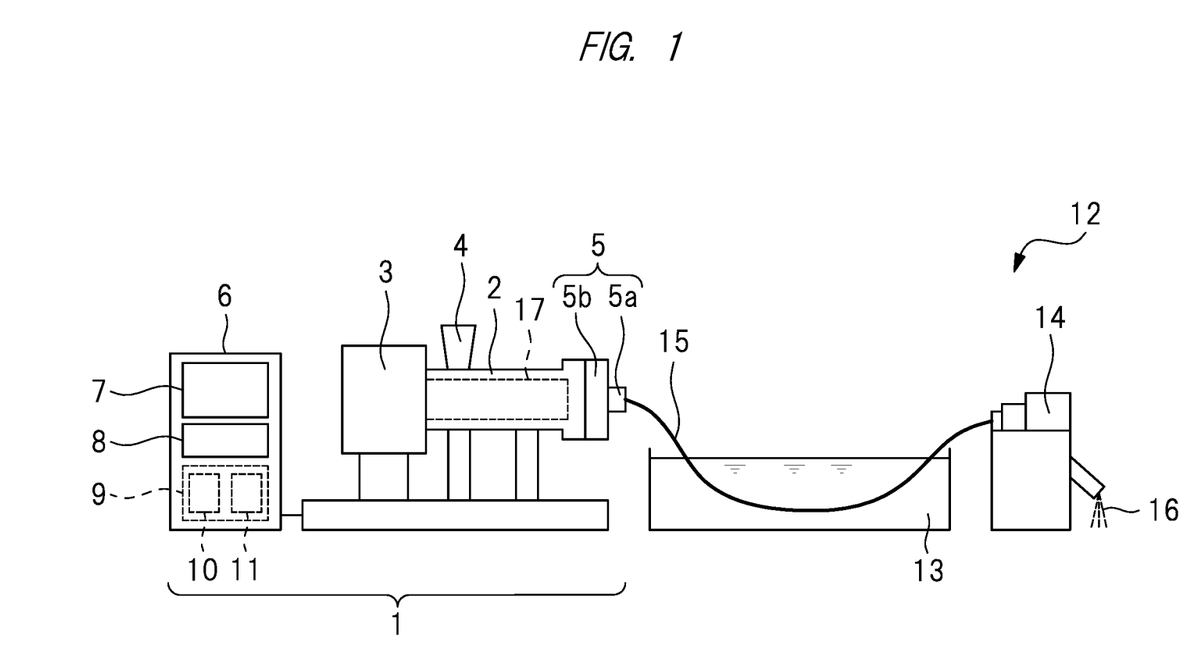
FIG. 1 is an explanatory diagram showing a configuration example of a pellet manufacturing system using an extruder according to one embodiment.

Extruder and Configuration Example of Pellet Manufacturing System Using the Same FIG. 1 is an explanatory diagram (side view) showing a configuration example of a pellet manufacturing system (pellet manufacturing apparatus) 12 using an extruder (extrusion molding machine) 1 according to the present embodiment.

First, a schematic configuration of the extruder 1 will be described with reference to FIG. 1. The extruder 1 shown in FIG. 1 includes a cylinder (barrel) 2, two screws 17 rotatably (freely rotatably) arranged in the cylinder 2, a rotary drive mechanism 3 for rotating the screws 17 in the cylinder 2, a hopper (resin input unit) 4 arranged on the upstream side (rear end side) of the cylinder 2, a die (mold) 5 attached to the downstream end of the cylinder 2, and an operation panel (operation unit, operation console) 6. The hopper 4 is connected to an upper surface of the cylinder 2, and a resin can be supplied into the cylinder 2 through the hopper 4. The temperature of the cylinder 2 is controlled by a temperature adjusting unit (temperature adjusting mechanism) (not shown) such as a heater. The extruder 1 may further include a filler feeder (not shown) connected to the cylinder 2, and in such a case, desired filler can be fed into the cylinder 2 from the filler feeder.

When referring to the "downstream side" and "upstream side" with respect to the extruder 1, the "downstream side" means the downstream side of the resin flow in the extruder 1, and the "upstream side" means the upstream side of the resin flow in the extruder 1. Therefore, in the extruder 1, the side closer to a plurality of holes 21 of the die 5 described later is the downstream side, and the side farther from the plurality of holes 21 of the die 5, that is, the side closer to the hopper 4 is the upstream side.

The two screws 17 are rotatably (freely rotatably) inserted and incorporated inside the cylinder 2. Therefore, the extruder 1 can be regarded also as a twin-screw extruder (twin-screw extrusion machine). The two screws 17 are arranged so as to mesh with each other and rotated in the cylinder 2. The longitudinal direction (long side direction, axial direction, extending direction) of the cylinder 2 and the longitudinal direction (long side direction, axial direction, extending direction) of the screws in the cylinder 2 are the same.

In the present embodiment, the case where the number of screws 17 in the cylinder 2 is two is described, but the number of screws 17 in the cylinder 2 may be one as another aspect. However, since the spatial volume can be increased when the number of screws 17 in the cylinder 2 is two, the supply capacity of the raw material can be increased in the case of double screws (two screws 17) as compared with the case of single screw (one screw 17) if the diameter of the screw is the same.

The die 5 can function to discharge a molten resin extruded from the cylinder 2 of the extruder 1 while shaping it into a predetermined cross-sectional shape (here, string-like shape). Therefore, the die 5 is a die (mold) for extrusion molding.

In this application, "melting" is not limited to melting with heat, but includes melting with a solvent or the like. For this reason, the case of melting a resin with a solvent, the case of melting a resin with microwaves, and the like may also be included in the "molten resin" in addition to the case of melting a resin by heating. Further, liquid resin may also be included in the "molten resin".

The operation panel 6 includes a display unit 7 and an input unit 8. The input unit 8 includes, for example, a keyboard, switches, dials, buttons, a touch panel, and the like for use in input. The operation of the extruder 1 can be controlled by inputting commands, data, and the like necessary for operating the extruder 1 into the input unit 8. The display unit 7 can display, for example, information input to the input unit 8, information related to the operation and state of the extruder 1, and the like.

The operation panel 6 includes a control unit 9 that controls the operation of the extruder 1. The control unit 9 controls the operation of the extruder 1 in accordance with commands, data, and the like input to the input unit 8. The control unit 9 can be configured by a computer including, for example, a semiconductor chip for control (semiconductor processor) and a semiconductor chip for storage (memory chip).

Also, the control unit 9 includes a calculation unit 10 that calculates the viscosity of the molten resin based on the measured value of a pressure measurement unit 31 described later (the pressure value of the molten resin measured by the pressure measurement unit 31). The calculation unit 10 is configured by, for example, a semiconductor chip for calculation (semiconductor processor). The viscosity calculated by the calculation unit 10 can be displayed on the display unit 7.

Also, the control unit 9 includes a storage unit 11. The viscosity calculated by the calculation unit 10 can also be stored (recorded) in the storage unit 11. The storage unit 11 is configured by, for example, a semiconductor chip for storage (memory chip).

Here, the case where the control unit 9 is built in the operation panel 6 is described, but the control unit 9 (computer for control) may be provided separately from the operation panel 6 (that is, outside the operation panel 6) as another aspect. Further, here, the case where the calculation unit 10 and the storage unit 11 are included in the control unit 9 is described, but one or both of the calculation unit 10 and the storage unit 11 may be provided separately from the control unit 9 (computer for control). Also, the display unit 7 may be provided separately from the operation panel 6 (that is, outside the operation panel 6).

The pellet manufacturing system 12 shown in FIG. 1 further includes a cooling bath 13 and a cutting machine 14 in addition to the extruder 1.

Next, the operation of the pellet manufacturing system 12 including the extruder 1 shown in FIG. 1 will be briefly described.

In the extruder 1, the resin material (thermoplastic resin) supplied from the hopper 4 into the cylinder 2 is melted while being sent forward by the rotation of the screws 17 in the cylinder 2 (that is, becomes molten resin). In the case where the filler is supplied into the cylinder 2 from the filler feeder (not shown), the resin (molten resin) and the filler are kneaded by the rotation of the screws 17 in the cylinder 2 of the extruder 1, and thus the filler is contained in the molten resin in the cylinder 2. Note that the operation of the extruder 1 is performed by inputting commands, data, and the like required for operating the extruder 1 to the input unit 8, and the operation of the extruder 1 is controlled by the control unit 9.

In the extruder 1, the molten resin sent forward in the cylinder 2 by the rotation of the screws 17 is extruded (discharged) from the die 5 (more specifically, the plurality of holes 21 of the die 5 described later) attached to the tip of the cylinder 2. At this time, the molten resin is shaped into a string-like shape by the die 5 and extruded as a strand (resin strand) 15 from the die 5. The strand 15 extruded from the die 5 of the extruder 1 is cooled and solidified (cured) in the cooling bath 13. The solidified strand 15 is cut into a predetermined length by the cutting machine 14. As a result, pellets (resin pellets) 16 are manufactured as a resin product. In the pellet manufacturing system 12, the extruder 1 can function as a strand manufacturing apparatus.

Therefore, the process of manufacturing the resin product (here, pellets 16) includes a step of preparing the extruder 1 having the cylinder 2 and the die 5 attached to the cylinder 2 and a step of supplying a resin material into the cylinder 2 of the extruder 1 to form the molten resin and discharging the molten resin from the holes 21 of the die 5. The process of manufacturing the resin product (here, pellets 16) further includes a step of measuring the pressure of the molten resin in the cylinder 2 or the die 5 of the extruder 1 by the pressure measurement unit 31 described later and a step of calculating the viscosity of the molten resin by the calculation unit 10 based on the pressure of the molten resin measured by the pressure measurement unit 31. The measurement of the pressure of the molten resin by the pressure measurement unit 31 and the calculation of the viscosity of the molten resin by the calculation unit 10 will be described later in detail.

Configuration of Die

Next, the configuration around the tip of the extruder 1 of the present embodiment, in particular, the configuration of the die (mold) 5 will be described with reference to FIG. 2 to FIG. 6.

Figure 2:
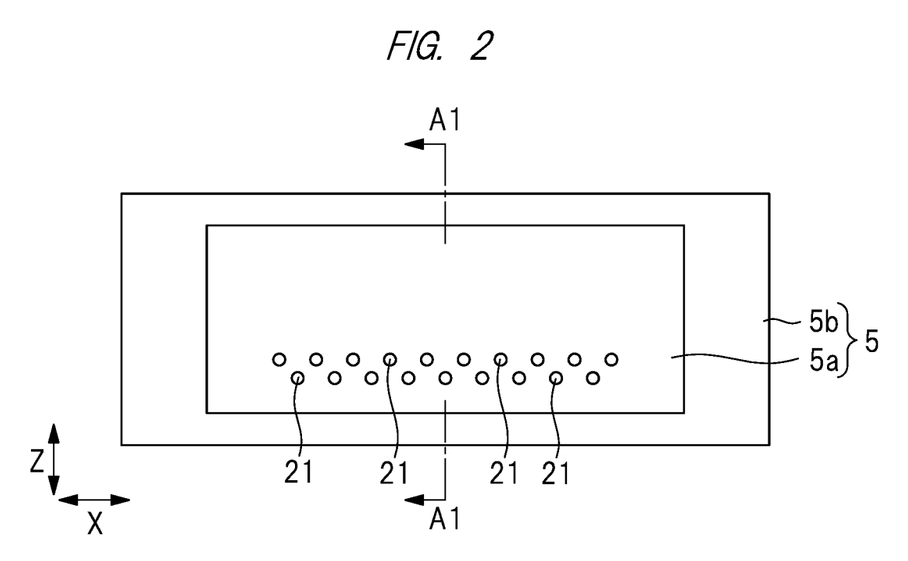
FIG. 2 is a front view of the extruder according to one embodiment.
Figure 3:
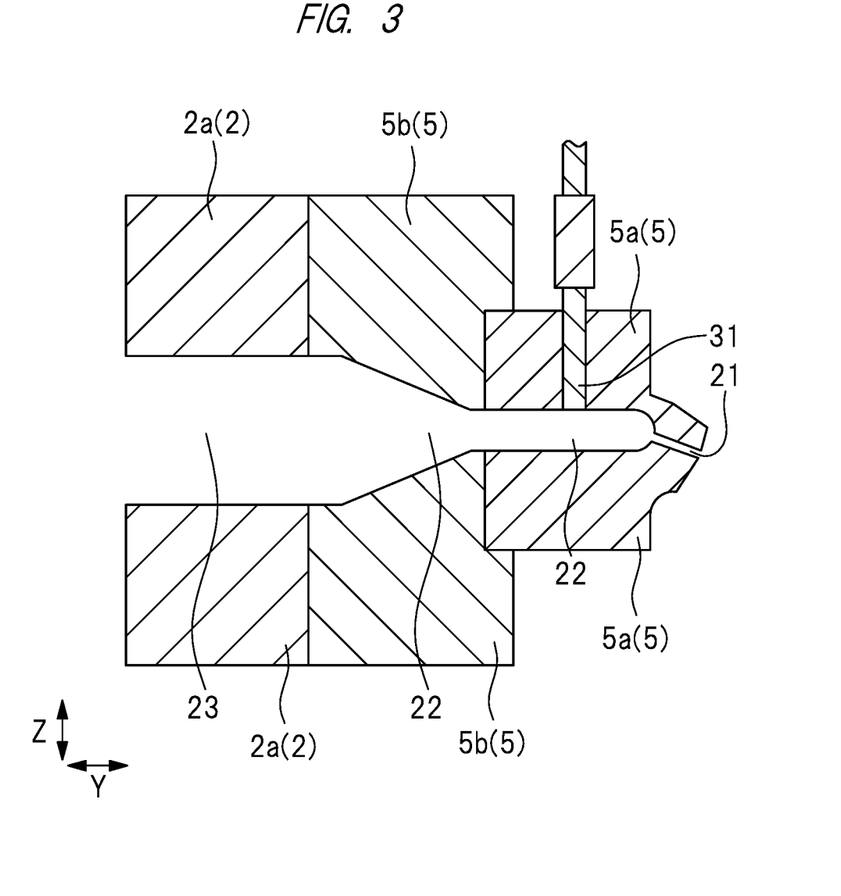
FIG. 3 is a cross-sectional view showing a principal part of the extruder according to one embodiment.
Figure 4:
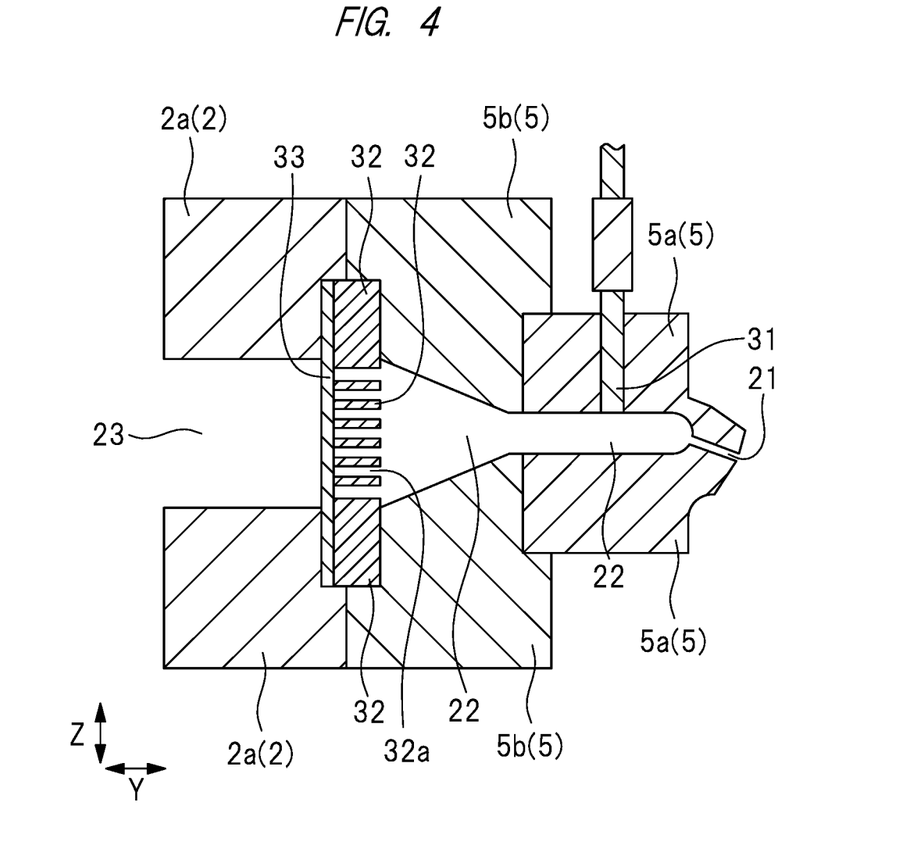
FIG. 4 is a cross-sectional view showing a principal part of a modification of the extruder according to one embodiment.
Figure 5:
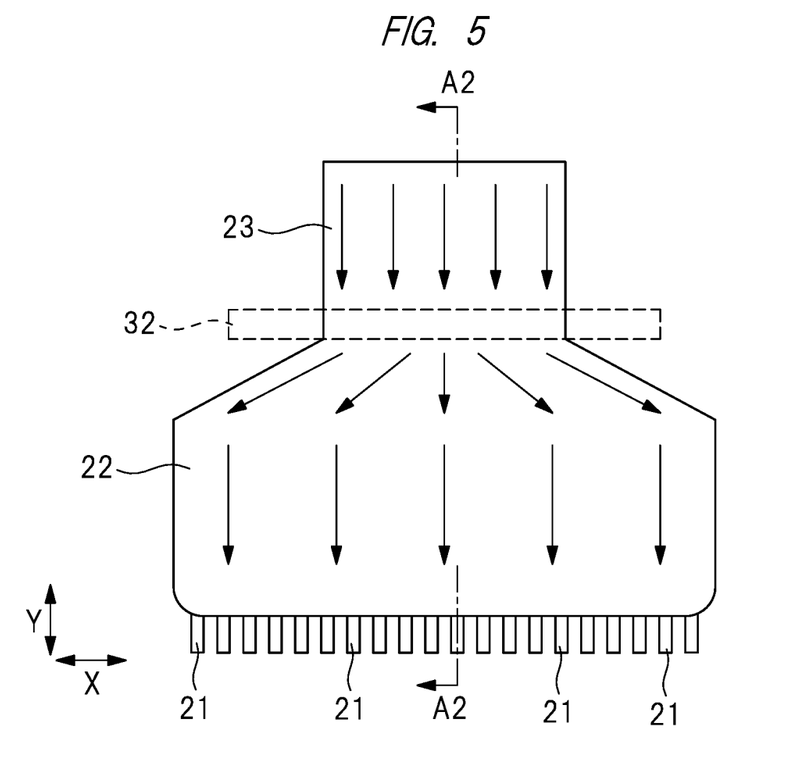
FIG. 5 is a plan view showing a flange portion of a cylinder, a resin flow path portion and a plurality of holes formed in a die.
Figure 6:
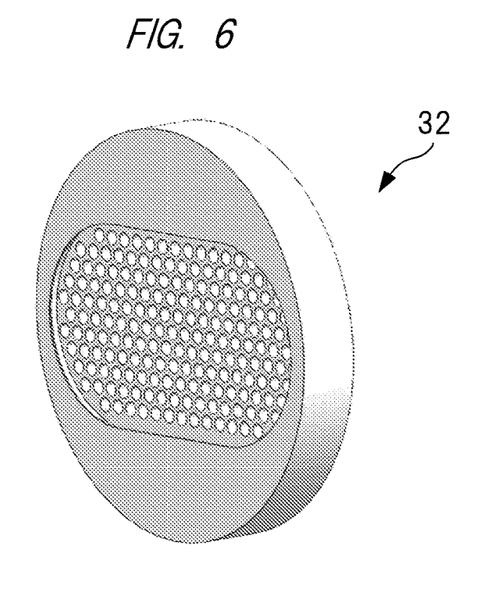
FIG. 6 is a perspective view showing a breaker plate.

FIG. 2 is a front view of the extruder 1 of the present embodiment, and it shows a front view of the die 5 attached to the tip of the cylinder 2. FIG. 3 is a cross-sectional view showing a principal part of the extruder 1 of the present embodiment. FIG. 3 substantially corresponds to a cross-sectional view taken along the line A1-A1 shown in FIG. 2. FIG. 4 is a cross-sectional view showing a principal part of a modification of the extruder 1 of the present embodiment, and it shows a cross section corresponding to FIG. 3. Note that illustration of fixing members (screws, etc.) for fixing each member is omitted in FIG. 2 to FIG. 4 for the sake of simplification. FIG. 5 is a plan view showing a flange portion 2a of the cylinder 2, an opening 23, a resin flow path portion 22, and the plurality of holes 21 formed in the die 5. In FIG. 5, the flow of molten resin is schematically shown by arrows. Moreover, when a breaker plate 32 is provided as shown in FIG. 4, the breaker plate 32 is located at the position indicated by the dotted line in FIG. 5. Note that FIG. 3 and FIG. 4 correspond to the cross-sectional views taken along the line A1-A1 in FIG. 2, and also correspond to the cross-sectional views taken along the line A2-A2 in FIG. 5. FIG. 6 is a perspective view showing the breaker plate 32.

Note that FIG. 2 to FIG. 5 show the X direction, the Y direction, and the Z direction. The X direction, the Y direction, and the Z direction are directions intersecting each other, and more particularly are directions orthogonal to each other. Therefore, the X direction and the Y direction are orthogonal to each other, and the Z direction is orthogonal to the X direction and the Y direction. The X direction and Y direction correspond to the horizontal direction, and the Z direction corresponds to the vertical direction (height direction). The Y direction is the extending direction (longitudinal direction, axial direction) of the cylinder 2 and is also the direction in which the molten resin mainly flows through the opening 23 and the resin flow path portion 22.

The die 5 has the plurality of holes (die hole, discharge port, nozzle, opening) 21 for discharging the molten resin (here, strand 15 made of molten resin) and the resin flow path portion 22 that guides the molten resin supplied (introduced) from the cylinder 2 to the plurality of holes 21. Namely, the resin flow path portion 22 and the plurality of holes 21 are formed in the die 5. The plurality of holes 21 are spatially connected to the resin flow path portion 22. The resin flow path portion 22 extends in the flow path direction (here, the Y direction) from the inlet through which the molten resin flows from the cylinder 2 to the plurality of holes 21. In the die 5, the plurality of holes 21 are arranged in the X direction and separated from each other. FIG. 2 shows a case where the plurality of holes 21 are arrayed in a zigzag arrangement, but the plurality of holes 21 may be arrayed in a single row as another aspect. Further, since FIG. 2 and FIG. 5 are schematic diagrams, the number of holes 21 in FIG. 2 does not match the number of holes 21 in FIG. 5, but they actually match. The number of holes 21 formed in the die 5 can be, for example, about 3 to 100.

Moreover, it is preferable that the extending direction of each of the plurality of holes 21 provided in the die 5 is inclined downward with respect to the Y direction. Namely, each hole 21 preferably extends obliquely downward. As a result, the molten resin is discharged obliquely downward from the plurality of holes 21, which makes it easier to guide the strand 15 to the cooling bath 13.

The plurality of holes 21 communicate with (are spatially connected to) the common resin flow path portion 22. The resin flow path portion 22 and the plurality of holes 21 are spaces in which the molten resin supplied (introduced) to the die 5 can flow (move). The resin flow path portion 22 and the plurality of holes 21 can be regarded also as a flow path (resin flow path) formed in the die 5 through which the molten resin passes. The resin flow path composed of the resin flow path portion 22 and the plurality of holes 21 is surrounded by the metal material constituting the die 5.

The plurality of holes 21 function to shape the molten resin (strand 15) extruded from the die 5 into a predetermined cross-sectional shape. Namely, since the molten resin is discharged to the outside of the die 5 through the plurality of holes 21, the molten resin is shaped into the predetermined cross-sectional shape by the holes 21 and discharged (extruded) from the holes 21 to the outside of the die 5. For example, when the cross-sectional shape of the hole 21 (cross-sectional shape substantially perpendicular to the extending direction of the hole 21) is circular, the cross-sectional shape of the molten resin (strand 15) (cross-sectional shape substantially perpendicular to the extending direction of the strand 15) discharged from the hole 21 is also circular. Further, it is also possible to control the diameter of the strand 15 by the diameter of the hole 21. However, the diameter of the strand 15 changes also depending on the flow velocity of the molten resin when it is discharged from the hole 21. The resin flow path portion 22 functions as a flow path (resin flow path) for guiding the molten resin supplied from the cylinder 2 to the die 5 to the plurality of holes 21.

The die 5 is composed of a die member (die main body portion) 5a and a die member (die holder portion, die holding portion) 5b. Namely, the die 5 has the die member 5a and the die member 5b, and the die member 5b is attached to the flange portion 2a at the tip (downstream tip) of the cylinder 2 of the extruder 1 and the die member 5a is attached to the front side of the die member 5a (the side opposite to the side connected to the flange portion 2a of the cylinder 2). Therefore, the die member 5a is held by the flange portion 2a of the cylinder 2 via the die member 5b, and the die member 5b has a function of holding the die member 5a. The plurality of holes 21 are formed in the die member 5a. The resin flow path portion 22 is formed over the die member 5a and the die member 5b, and is mainly formed in the die member 5b. Therefore, the die member 5b has a function of holding the die member 5a in which the plurality of holes 21 are formed and defining (specifying) the resin flow path portion 22 for guiding the molten resin from the cylinder 2 to the plurality of holes 21.

Although the die 5 can be composed of a single integral member, the plurality of holes 21 and the resin flow path portion 22 can be easily formed and the processing of the die 5 becomes easy if the die 5 is composed of a plurality of members (here, die members 5a and 5b). Since it is the hole 21 formed in the die member 5a that defines the cross-sectional shape of the strand 15, it is also possible to regard the die member 5a as a die and the die member 5b as a die holder portion for holding the die (die member 5a). Alternatively, the die member 5b can be composed of a plurality of members (metal members, mold members), and in such a case, the die member 5b can be configured by fixing the plurality of members with fixing members such as screws or bolts.

The die 5 is preferably made of a metal material, and thus the die members 5a and 5b are preferably made of a metal material. The die member 5a is fixed to the die member 5b by fixing members (not shown) such as screws or bolts. Further, the die member 5b is attached and fixed to the flange portion 2a of the cylinder 2 by fixing members (not shown) such as screws or bolts.

The extruder 1 of the present embodiment includes the pressure measurement unit 31 for measuring the pressure of the molten resin in the cylinder 2 or the die 5. The pressure measurement unit 31 includes, for example, a pressure sensor (pressure gauge). The pressure measurement unit 31 can be arranged in the cylinder 2 or the die 5.

However, it is desirable that the pressure measurement unit 31 measures the pressure of the molten resin at a position on the upstream side of the hole 21 and as close to the hole 21 as possible in the flow path of the molten resin in the extruder 1. Therefore, it is preferable that the pressure measurement unit 31 is arranged in the die 5 instead of the cylinder 2 and measures the pressure of the molten resin in the resin flow path portion 22 in the die 5 (molten resin flowing through the resin flow path portion 22). Further, it is more preferable that the pressure measurement unit 31 is arranged in the die member 5a and the pressure of the molten resin in the resin flow path portion 22 of the die member 5a (molten resin flowing through the resin flow path portion 22) is measured by the pressure measurement unit 31, and this case is shown in FIG. 3 and FIG. 4.

FIG. 4 is a modification of the structure of FIG. 3, and it shows a case where the breaker plate 32 and a screen mesh 33 are used. As shown in FIG. 4, the breaker plate 32 can be interposed in the middle of the flow (flow path) of the molten resin on the upstream side of the plurality of holes 21. As can be seen from FIG. 4 and FIG. 6, the breaker plate 32 is a member in which a plurality of openings (holes) 32a through which molten resin can pass are formed (arrayed).

Further, as shown in FIG. 4, not only the breaker plate 32 but also the screen mesh 33 can be further interposed in the middle of the flow (flow path) of the molten resin on the upstream side of the plurality of holes 21. The screen mesh 33 is a net-like member and has a plurality of openings (holes) through which the molten resin can pass.

The breaker plate 32 and the screen mesh 33 are arranged on the upstream side of the holes 21, more specifically, between the flange portion 2a of the cylinder 2 and the die 5 (therefore, between the opening 23 of the flange portion 2a and the resin flow path portion 22 of the die 5). The number of screen meshes 33 may be one or plural. Although it is preferable to use both the breaker plate 32 and the screen mesh 33, either one may be used.

Since the size of the opening of the screen mesh 33 is smaller than the size of the opening 32a of the breaker plate 32, the opening of the screen mesh 33 is not shown in FIG. 4. However, since the screen mesh 33 and the breaker plate 32 both have a plurality of openings through which the molten resin can pass, the molten resin supplied from the cylinder 2 can flow into the resin flow path portion 22 of the die 5 through (the plurality of openings of) the screen mesh 33 and (the plurality of openings 32a of) the breaker plate 32. The screen mesh 33 and the breaker plate 32 have the function of filtering foreign substances in the molten resin and the function of increasing the back pressure in the cylinder 2 to increase the kneading effect of the resin in the cylinder 2.

The die member 5b is attached to the flange portion 2a of the cylinder 2 such that the opening (outlet of the molten resin) 23 of the flange 2a at the tip of the cylinder 2 and the resin flow path portion 22 of the die 5 communicate (are spatially connected). Therefore, the molten resin conveyed while being kneaded by the screws 17 in the cylinder 2 is extruded from the opening 23 of the flange portion 2a at the tip of the cylinder 2, supplied to the resin flow path portion 22 of the die 5, flows into the plurality of holes 21 through the resin flow path portion 22, and is discharged from the plurality of holes 21 to the outside of the die 5. The molten resin discharged from the plurality of holes 21 becomes the strand 15 mentioned above. Further, when the breaker plate 32 and the screen mesh 33 are provided as shown in FIG. 4, the molten resin extruded from the opening 23 of the flange portion 2a at the tip of the cylinder 2 is supplied to the resin flow path portion 22 of the die 5 through (the plurality of openings of) the screen mesh 33 and (the plurality of openings 32a of) the breaker plate 32.

Main Features and Effects

The extruder 1 of the present embodiment includes the pressure measurement unit 31 that measures the pressure of the molten resin in the cylinder 2 or the die 5 and the calculation unit 10 that calculates the viscosity of the molten resin based on the measured value of the pressure measurement unit 31 (pressure value of the molten resin measured by the pressure measurement unit 31). In addition, the process of manufacturing the resin product (here, pellets 16) by using the extruder 1 of the present embodiment includes the step of measuring the pressure of the molten resin in the cylinder 2 or the die 5 of the extruder 1 by the pressure measurement unit 31 and the step of calculating the viscosity of the molten resin by the calculation unit 10 based on the pressure of the molten resin measured by the pressure measurement unit 31.

The molten resin extruded from the cylinder 2 is supplied to the resin flow path portion 22 of the die 5, flows into the plurality of holes 21 through the resin flow path portion 22, and is discharged (extruded) from the plurality of holes 21 to the outside of the die 5. At this time, since the opening diameter of the hole 21 is quite small, pressure loss occurs when passing through the hole 21. The pressure loss when the molten resin passes through the hole 21 depends on the viscosity of the molten resin, and the pressure loss increases as the viscosity becomes higher and the pressure loss decreases as the viscosity becomes lower. Therefore, if the pressure loss when the molten resin passes through the hole 21 is known, the viscosity of the molten resin passing through the hole 21 can be known (estimated). The pressure loss when the molten resin passes through the hole 21 is the difference between the pressure of the molten resin immediately before passing through the hole 21 and the pressure of the molten resin immediately after being discharged to the outside of the die 5 through the hole 21, and the pressure of the molten resin immediately after being discharged to the outside of the die 5 is almost equal to the atmospheric pressure. Therefore, by estimating the pressure of the molten resin immediately before passing through the hole 21 from the measured value of the pressure measurement unit 31, it is possible to estimate the pressure loss that occurs when the molten resin passes through the hole 21, and the viscosity of the molten resin passing through the hole 21 can be calculated based on the estimated pressure loss. The calculation unit 10 can perform such calculation of the viscosity of the molten resin based on the measured value of the pressure measurement unit 31. Specific examples of the calculation method will be described in more detail later.

Since the pressure of the molten resin in the cylinder 2 or the die 5 is measured by the pressure measurement unit 31 while discharging the strand 15 made of the molten resin from the plurality of holes 21 of the die 5 by operating the extruder 1 and the viscosity of the molten resin can be calculated by the calculation unit 10 based on the measured value, the viscosity of the molten resin during the operation of the extruder 1 can be grasped in real time. Further, by continuously monitoring the pressure of the molten resin by the pressure measurement unit 31, the viscosity of the molten resin during the operation of the extruder 1 can be continuously monitored. The viscosity of the molten resin calculated by the calculation unit 10 can be displayed on the display unit 7, and can be displayed on the display unit 7 at all times by using, for example, numerical values or graphs. Namely, the process of manufacturing the resin product (here, pellets 16) by using the extruder 1 of the present embodiment further includes a step of displaying the viscosity of the molten resin calculated by the calculation unit 10 on the display unit 7. Therefore, the real-time viscosity of the molten resin during the operation of the extruder 1, the change in the viscosity over time, and the like can be easily and accurately grasped by looking at the display unit 7. The quality of the resin product (here, pellets 16) manufactured by using the extruder 1 depends on the viscosity of the molten resin formed in the cylinder 2 and discharged from the plurality of holes 21 of the die 5. For this reason, in order to appropriately manage the quality of the resin product (here, pellets 16) manufactured by using the extruder 1, it is extremely useful that the real-time viscosity of the molten resin during the operation of the extruder 1 and the change of the viscosity of the molten resin over time when the extruder 1 is operated continuously for a long period of time can be grasped. In the present embodiment, this can be achieved because the extruder 1 includes the pressure measurement unit 31 and the calculation unit 10, so that it becomes easy to manage the quality of the resin product (here, pellets 16) manufactured by using the extruder 1. Therefore, the manufacturing cost of the resin product (here, pellets 16) manufactured by using the extruder 1 can be suppressed. In addition, since the continuous change of the viscosity of the molten resin over time during the operation of the extruder 1 can be visually confirmed on the display unit 7, the kneading state (kneading index) of the resin in the extruder 1 and the stability of the quality of the molten resin (strand 15) discharged from the plurality of holes 21 of the die 5 can be easily grasped.

Further, the viscosity of the molten resin calculated by the calculation unit 10 can be stored (recorded) in the storage unit 11. When the viscosity of the molten resin changes due to some factor, the change can be grasped in real time by the display unit 7, and it is also possible to confirm afterward that the viscosity of the resin has changed due to some factor by storing (recording) the change of the molten resin over time in the storage unit 11.

In addition, it is also possible to obtain the viscosity of the molten resin as discontinuous (periodic) data (for example, the viscosity measured at the same time every day) by the pressure measurement unit 31 and the calculation unit 10 and monitor the stability of the quality of the resin product (here, pellets 16) by using the data. Further, it is also possible to display the discontinuous (periodic) data and the data of the stability of the quality of the resin product (here, pellet 16) determined by the data on the display unit 7.

First Example of Calculation Method of Viscosity of Molten Resin

Next, the first example of the specific method of calculating the viscosity of the molten resin based on the pressure value of the molten resin measured by the pressure measurement unit 31 will be described.

Since the cross-sectional size of the hole 21 of the die 5 (area of cross section substantially perpendicular to the direction in which the molten resin flows) is quite small as compared with the cross-sectional size of the resin flow path portion 22 of the die 5 (area of cross section substantially perpendicular to the direction in which the molten resin flows), the pressure loss of the molten resin when flowing through the resin flow path portion 22 is not so large, whereas the pressure loss of the molten resin when passing through the hole 21 is quite large.

The shear rate $\gamma_a$ when the molten resin passes through the hole 21 is expressed by the following Equation 1.

Sheer rate

[Equation 1]

$$\gamma_a = \frac{32Q}{\pi D^3} [1/s] \quad \text{(Equation 1)}$$

D: Diameter of hole 21 [m]
Q: Flow rate $Q = Q_0/N \ [m^3/s]$

D in Equation 1 is the diameter of the hole 21, and Q in Equation 1 is the flow rate of the molten resin passing through each of the holes 21. The flow rate Q is expressed as $Q=Q_0/N$, $Q_0$ is the flow rate of the molten resin supplied from the cylinder 2 to the resin flow path portion 22 of the die 5, and N is the number of holes 21. $Q_0$ can be set as an extrusion flow rate set value when operating the extruder 1.

Also, the shear stress σ when the molten resin passes through the hole 21 is expressed by the following Equation 2.

Shear stress

[Equation 2]

$$\sigma = \frac{\Delta P \cdot D}{4L} \ [Pa] \quad \text{(Equation 2)}$$

ΔP: Pressure loss when passing through hole 21

$\Delta P = P1 - P0 [Pa]$

L: Length of hole 21 [m]

ΔP in Equation 2 is the pressure loss when the molten resin passes through the hole 21, and is expressed as $\Delta P = P_1 - P_0$. Here, $P_1$ is the pressure of the molten resin immediately before passing through the hole 21, and the pressure of the molten resin measured by the pressure measurement unit 31 can be used as this pressure $P_1$. $P_0$ is the pressure of the molten resin immediately after being discharged through the hole 21 to the outside of the die 5, and the atmospheric pressure can be used as the value of this pressure $P_0$. L in Equation 2 is the length of the hole 21 (the length in the direction in which the resin flows).

The viscosity $\eta_a$ of the molten resin is expressed by the following Equation 3 based on Equations 1 and 2.

Viscosity

[Equation 3]

$$\eta_a = \frac{\sigma}{\gamma_a} = \frac{\pi D^4 \Delta P}{128 L Q} \ [\text{Pa} \cdot \text{s}] \quad \text{(Equation 3)}$$

In this Equation 3, the diameter D of the hole 21 and the length L of the hole 21 are known values, and the flow rate Q (=$Q_0$/N) of the molten resin passing through each hole 21 is the value that can be controlled by the set value of the extrusion flow rate ($Q_0$) when operating the extruder 1. Therefore, as can be seen from Equation 3, the viscosity $\eta_a$ can be calculated if the pressure loss $\Delta P$ when the molten resin passes through the hole 21 is known. As described above, by using the atmospheric pressure as the value of the pressure $P_0$ and the pressure of the molten resin measured by the pressure measurement unit 31 as the value of the pressure $P_1$ in $\Delta P = P_1 - P_0$, the viscosity $\eta_a$ of the molten resin can be calculated from Equation 3.

For example, the diameter D and the length L of the hole 21 and the number N of the holes 21 may be input in advance to a viscosity calculation program of the calculation unit 10, and the flow rate Q may be automatically input when the extrusion flow rate ($Q_0$) of the extruder 1 is set. Then, the pressure measurement unit 31 measures the pressure of the molten resin, and the calculation unit 10 can calculate the viscosity $\eta_a$ of the molten resin from Equation 3 based on the measured value.

Further, it is assumed here that the pressure loss occurs in the hole 21, and the viscosity of the molten resin is calculated based on it. Therefore, it is preferable that the pressure of the molten resin at the entrance of the hole 21 and the pressure of the molten resin measured by the pressure measurement unit 31 match as much as possible, whereby the accuracy of the viscosity of the molten resin calculated based on the measured value of the pressure measurement unit 31 can be improved. For this reason, it is preferable that the pressure loss due to the movement of the molten resin from the pressure measurement position by the pressure measurement unit 31 to the entrance of the hole 21 is sufficiently lower than the pressure loss due to the passage of the molten resin through the hole 21, and in order to achieve this, the pressure measurement position of the molten resin by the pressure measurement unit 31 is preferably as close to the entrance of the hole 21 as possible. However, the pressure measurement unit 31 measures the pressure of the molten resin before the hole 21 (on the upstream side of the hole 21) instead of the pressure of the molten resin in the hole 21. From this point of view, it is preferable that the pressure measurement unit 31 is arranged in the die 5 instead of the cylinder 2 and the pressure of the molten resin in the resin flow path portion 22 in the die 5 is measured by the pressure measurement unit 31, and it is more preferable that the pressure measurement unit 31 is arranged in the die member 5a and the pressure of the molten resin in the resin flow path portion 22 in the die member 5a is measured by the pressure measurement unit 31.

Figure 7:
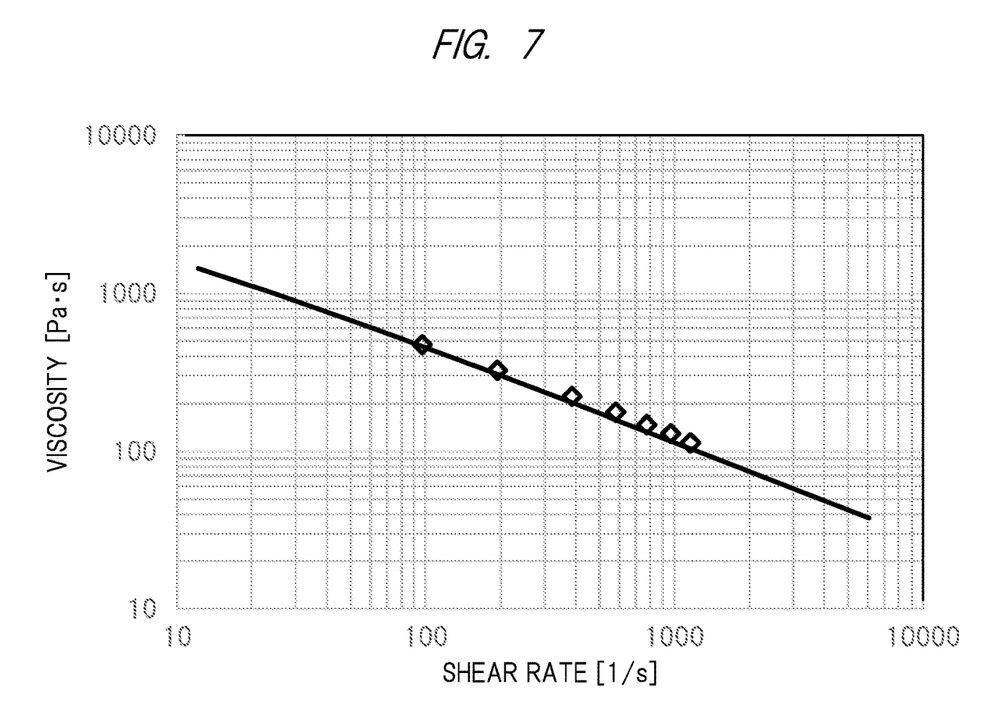
FIG. 7 is a graph showing a correlation between the shear rate and viscosity of a resin.

FIG. 7 is a graph showing the correlation between the shear rate and viscosity of a resin. Values obtained when the viscosity of the molten resin is calculated from the measured values of the pressure measurement unit 31 according to the method of the first example described above are plotted with rhombuses. A viscosity fitting curve obtained by measuring the viscosity of the manufactured resin pellets by using a capillary rheometer is shown by a solid line.

As can be seen from FIG. 7, the plot of rhombuses and the viscosity fitting curve shown by a solid line almost match each other. From this, it can be understood that, if the viscosity of the molten resin is calculated from the measured value of the pressure measurement unit 31 according to the method of the first example described above, the viscosity characteristics of the manufactured resin product (here, resin pellets) can be grasped and the quality of the manufactured resin product (resin pellets) can be managed.

Second Example of Calculation Method of Viscosity of Molten Resin

Next, the second example of the specific method of calculating the viscosity of the molten resin based on the pressure value of the molten resin measured by the pressure measurement unit 31 will be described. This second example assumes that the breaker plate 32 and the screen mesh 33 are used as in the structure of FIG. 4.

Also in the case of the structure shown in FIG. 4, the pressure loss of the molten resin when flowing through the resin flow path portion 22 is not so large, whereas the pressure loss of the molten resin when passing through the hole 21 is quite large as described above. However, in the case of the structure shown in FIG. 4, the pressure loss of the molten resin when passing through openings of the screen mesh 33 and openings 32a of the breaker plate 32 also becomes quite large.

Therefore, also in the case of the structure shown in FIG. 4, if the viscosity of the molten resin is measured by the pressure measurement unit 31 on the downstream side of the screen mesh 33 and the breaker plate 32, the viscosity of the molten resin can be calculated by using the method of the first example described above based on the measured value of the pressure measurement unit 31 without taking into account the pressure loss when passing through the screen mesh 33 and the breaker plate 32. If the viscosity of the molten resin is measured by the pressure measurement unit 31 on the downstream side of the screen mesh 33 and the breaker plate 32, even when the screen mesh 33 and the breaker plate 32 are clogged due to some factor, it is possible to prevent the measured value of the pressure measurement unit 31 from being affected by the clogging, so that the stability of the measured value of the pressure measurement unit 31 can be improved. Therefore, also in the case of the structure of FIG. 4, it is preferable that the viscosity of the molten resin is measured by the pressure measurement unit 31 on the downstream side of the screen mesh 33 and the breaker plate 32, and thus the pressure measurement unit 31 is preferably arranged in the die 5, and is more preferably arranged in the die member 5a.

However, even if the viscosity of the molten resin is measured by the pressure measurement unit 31 on the upstream side of the screen mesh 33 and the breaker plate 32 (that is, the pressure measurement unit 31 is arranged in the cylinder 2) in the case of the structure shown in FIG. 4, the viscosity of the molten resin can be calculated based on the measured value of the pressure measurement unit 31 by using the method of the second example described below.

Figure 8:
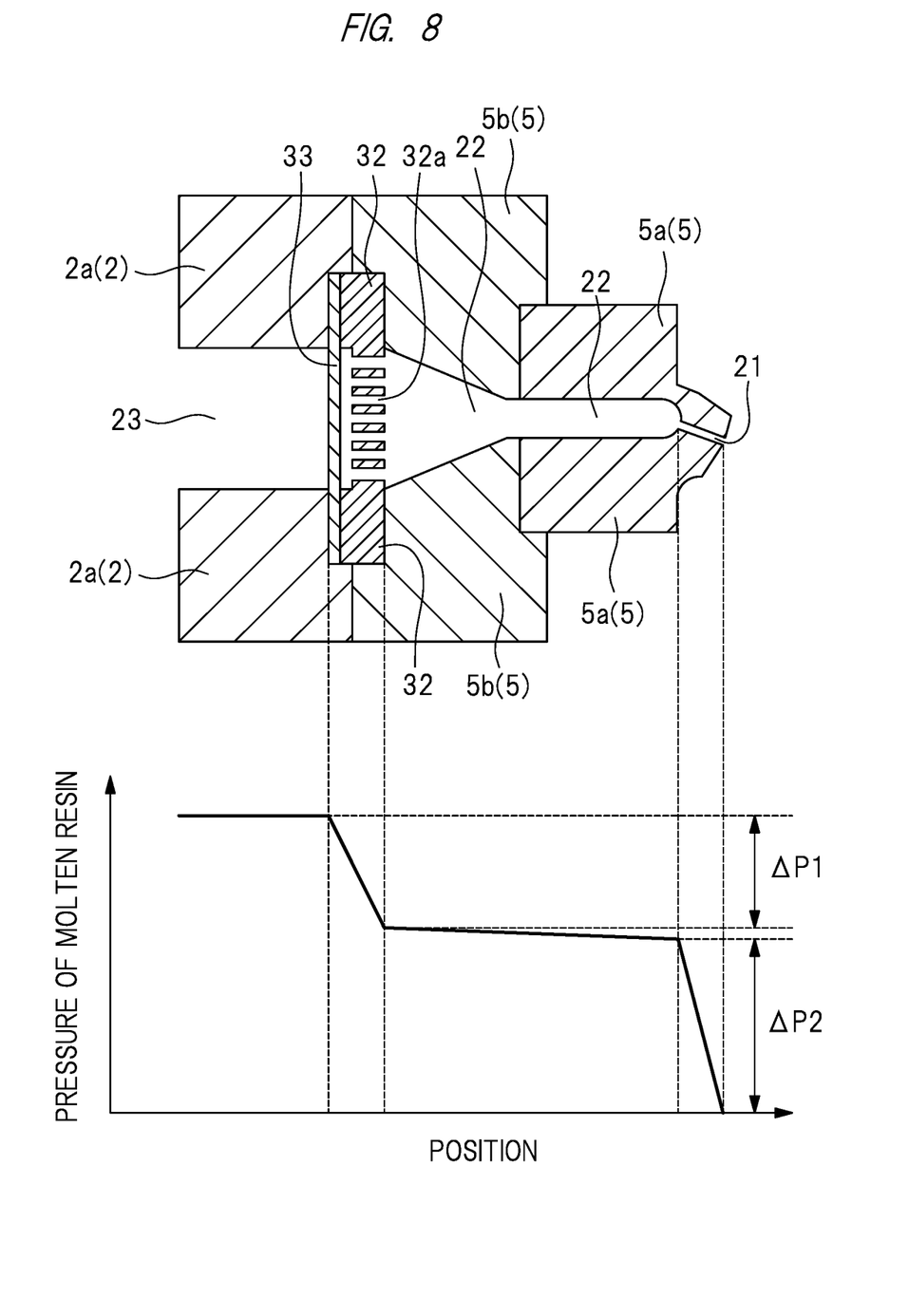
FIG. 8 is an explanatory diagram showing a structure of a tip portion of the extruder and a graph showing the pressure of a molten resin at each position of the structure.

FIG. 8 is an explanatory diagram showing a structure of a tip portion of the extruder 1 and a graph showing the pressure of molten resin at each position of the structure.

Although illustration of the pressure measurement unit 31 is omitted in FIG. 8, the structure in FIG. 8 is the same as that of FIG. 4 other than that.

As can be seen from FIG. 8, the pressure of the molten resin greatly decreases and the pressure loss occurs when passing through the opening of the screen mesh 33 and the opening 32*a* of the breaker plate 32 and when passing through the hole 21. As compared with that, the pressure loss when passing through the resin flow path portion 22 is considerably small. Therefore, if the pressure measured value when the viscosity of the molten resin is measured by the pressure measurement unit 31 on the upstream side of the screen mesh 33 and the breaker plate 32 (that is, the pressure measurement unit 31 is arranged in the cylinder 2) is defined as Pa, the pressure measured value Pa is approximated and expressed by the following Equation 4.

[Equation 4]

$$Pa = \Delta P2 + \Delta P1 \quad \text{(Equation 4)}$$

Here, $\Delta P1$ in Equation 4 is the pressure loss when the molten resin passes through the hole 21, and $\Delta P2$ is the pressure loss when the molten resin passes through the opening of the screen mesh 33 and the opening 32*a* of the breaker plate 32. Also, it is assumed that the viscosity $\eta_a$ of the molten resin is constant.

By transforming the Equation 1 above, the following Equation 5 is obtained.

[Equation 5]

$$\Delta P1 = \frac{128 L_1 Q_1 \eta_a}{\pi D_1^4} \; [\text{Pa}] \quad \text{(Equation 5)}$$

$D_1$: Diameter of hole 21 [m]
$Q_1$: Flow rate $$Q_1 = Q_0/N_1 \; [m^3/s]$$

$L_1$: Length of hole 21 [m]

Here, $D_1$ in Equation 5 is the diameter of the hole 21, and $Q_1$ in Equation 5 is the flow rate of the molten resin passing through each hole 21. The flow rate $Q_1$ is expressed as $Q_1 = Q_0/N_1$, $Q_0$ is the flow rate of the molten resin supplied from the cylinder 2 to the resin flow path portion 22 of the die 5, and $N_1$ is the number of holes 21. $Q_0$ can be set as an extrusion flow rate set value when operating the extruder 1. $L_1$ in Equation 5 is the length of the hole 21 (the length in the direction in which the resin flows).

On the other hand, $\Delta P2$ in Equation 5 is expressed by the following Equation 6.

[Equation 6]

$$\Delta P2 = \Delta P2_B + \Delta P2_M \quad \text{(Equation 6)}$$

Here, $\Delta P2_B$ in Equation 6 is the pressure loss when passing through the opening 32*a* of the breaker plate 32, and $\Delta P2_M$ in Equation 6 is the pressure loss when passing through (the opening of) the screen mesh 33. As shown in Equation 6, $\Delta P2$ is expressed by the sum (total) of $\Delta P2_B$ and $\Delta P2_M$.

The pressure loss $\Delta P2_B$ when passing through the opening 32*a* of the breaker plate 32 can be calculated in the same manner as the pressure loss $\Delta P1$ when passing through the hole 21, and is expressed by the following Equation 7.

[Equation 7]

$$\Delta P2_B = \frac{128 L_2 Q_2 \eta_a}{\pi D_2^4} \; [\text{Pa}] \quad \text{(Equation 7)}$$

$D_2$: Diameter of opening 32*a* [m]
$Q_2$: Flow rate $$Q_2 = Q_0/N_2 \; [M^3/s]$$

$L_2$: Length of opening 32*a* [m]

Here, $D_2$ in Equation 7 is the diameter of the opening 32*a* of the breaker plate 32, and $Q_2$ in Equation 7 is the flow rate of the molten resin passing through each opening 32*a*. The flow rate $Q_2$ is expressed as $Q_2 = Q_0/N_2$, $Q_0$ is the flow rate of the molten resin supplied from the cylinder 2 to the resin flow path portion 22 of the die 5, and $N_2$ is the number of openings 32*a*. $Q_0$ can be set as an extrusion flow rate set value when operating the extruder 1. $L_2$ in Equation 7 is the length of the opening 32*a* of the breaker plate 32 (the length in the direction in which the resin flows).

The pressure loss $\Delta P2_M$ when passing through the screen mesh 33 can be calculated by the following Equation 8.

[Equation 8]

$$\Delta P2_M = \alpha \times u \times \eta_a + \beta \times \rho \times u^2 \; [Pa] \quad \text{(Equation 8)}$$

u: Flow velocity [m/s] (=flow rate $Q_0$/filtration area×1/6)
$\alpha$: Viscous resistance coefficient [$m^{-1}$]
$\beta$: Inertial resistance coefficient [–]
$\rho$: Density [kg/m$^3$]

Here, u in Equation 8 is the flow velocity of the molten resin, $\alpha$ is the viscous resistance coefficient, $\beta$ is the inertial resistance coefficient, and $\rho$ is the density. The viscous resistance coefficient $\alpha$ and the inertial resistance coefficient $\beta$ are the values specific to the screen mesh and can be provided by the manufacturer of the screen mesh. Also, when a plurality of screen meshes 33 are used in combination, the $\Delta P2_M$ obtained by Equation 8 may be added up for the number of screen meshes to be used.

By incorporating Equation 5, Equation 6, Equation 7, and Equation 8 into Equation 4, the following Equation 9 is obtained.

[Equation 9]

$$Pa = \underbrace{\frac{128 L_2 Q_2 \eta_a}{\pi D_2^4}}_{A} + \underbrace{\alpha \times u \times \eta_a}_{B} + \underbrace{\beta \times \rho \times u^2}_{E} + \underbrace{\frac{128 L_1 Q_1 \eta_a}{\pi D_1^4}}_{C} \quad \text{(Equation 9)}$$

Here, the part A in Equation 9 relates to the pressure loss when passing through the breaker plate 32, the part C in Equation 9 relates to the pressure loss when passing through the hole 21, and the parts B and E in Equation 9 relate to the pressure loss when passing through the screen mesh 33. Among them, the viscosity $\eta_a$ contributes to the parts A, B, and C. Therefore, by transforming Equation 9, the following Equation 10 is obtained.

[Equation 10]

$$Pa = (A + B + C)\eta_a + E \quad \text{(Equation 10)}$$

Here, A, B, C, and E in Equation 10 are the parts indicated by A, B, C, and E in Equation 9, respectively.

By transforming Equation 10, the following Equation 11 is obtained.

[Equation 11]

$$\eta_a = \frac{Pa - E}{A + B + C} \quad \text{(Equation 11)}$$

The viscosity of the molten resin is measured by the pressure measurement unit 31 on the upstream side of the screen mesh 33 and the breaker plate 32 from this equation 11, and the viscosity $\eta_a$ of the molten resin can be calculated based on the pressure measured value Pa.

Accordingly, even when the pressure measurement unit 31 is arranged in the cylinder 2 in the case where the breaker plate 32 and the screen mesh 33 are used as shown in FIG. 4 and the viscosity of the molten resin is measured by the pressure measurement unit 31 on the upstream side of the screen mesh 33 and the breaker plate 32, the calculation unit 10 can calculate the viscosity of the molten resin based on the pressure measured value of the pressure measurement unit 31.

However, when the pressure measurement unit 31 is arranged in the cylinder 2 and the viscosity of the molten resin is measured by the pressure measurement unit 31 on the upstream side of the screen mesh 33 and the breaker plate 32, if the screen mesh 33 and the breaker plate 32 are clogged due to some factor, the measured value of the pressure measurement unit 31 is affected by the clogging. This is not desirable because it leads to a deviation (error) between the calculated viscosity and the actual viscosity when the calculation unit 10 calculates the viscosity of the molten resin based on the measured value of the pressure measurement unit 31.

Therefore, when using members having a plurality of openings through which the molten resin passes such as the breaker plate 32 and the screen mesh 33, it is more preferable that the pressure of the molten resin is measured by using the pressure measurement unit 31 on the downstream side of the members and on the upstream side of the plurality of holes 21. In that case, the method of the first example described above may be used to calculate the viscosity. In this way, even when members having a plurality of openings through which the molten resin passes such as the screen mesh 33 and the breaker plate 32 are clogged due to some factor, it is possible to prevent the measured value of the pressure measurement unit 31 from being affected by the clogging. As a result, when the calculation unit 10 calculates the viscosity of the molten resin based on the measured value of the pressure measurement unit 31, the occurrence of deviation (error) between the calculated viscosity and the actual viscosity can be more accurately suppressed or prevented.

Modification

Figure 9:
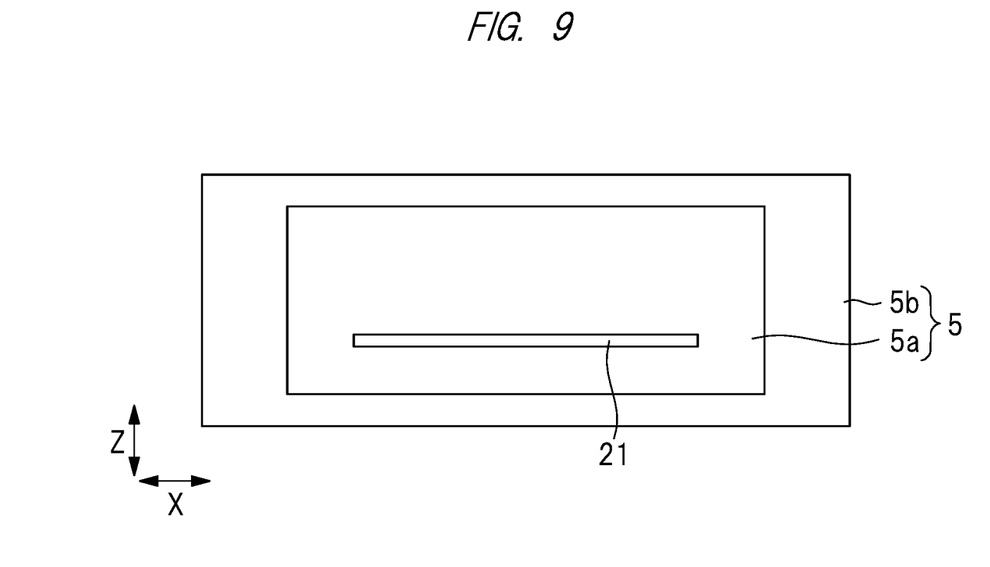
FIG. 9 is a plan view of a die used in another modification of the extruder according to one embodiment.

A further modification of the extruder 1 of the present embodiment will be described with reference to FIG. 9. FIG. 9 is a plan view of the die 5 used in the modification of the extruder 1 of the present embodiment, and corresponds to FIG. 2 above.

In the case of FIG. 2, the number of holes (openings for discharging molten resin) 21 provided in the die 5 is plural (two or more), but the number of holes (openings for discharging molten resin) 21 is one in the case of FIG. 9. Further, in the case of FIG. 9, the cross-sectional shape of the hole 21 (cross-sectional shape substantially perpendicular to the extending direction of the hole 21) is, for example, a slit shape, and the molten resin discharged from the slit-shaped hole 21 in this case is formed into a film shape instead of a strand shape. The film-shaped molten resin discharged (extruded) from the slit-shaped hole 21 shown in FIG. 9 becomes a resin film after being cooled and solidified by a cooling device such as a cooling roll. Therefore, in the case of FIG. 9, the manufactured resin product is, for example, a resin film. The resin film is conveyed to and wound up by a winding machine (not shown). Also in such a case, as described above, it is possible to measure the pressure of the molten resin in the cylinder 2 or the die 5 of the extruder 1 by the pressure measurement unit 31, calculate the viscosity of the molten resin by the calculation unit 10 based on the measured value of the pressure measurement unit 31, and display the viscosity of the molten resin on the display unit 7. In this way, the effects as described above can be obtained.

In the foregoing, the invention made by the inventors of this application has been concretely described based on the embodiment. However, it is needless to say that the present invention is not limited to the above-described embodiment and various modifications can be made within the range not departing from the gist thereof.

REFERENCE SIGNS LIST

1 extruder
2 cylinder
3 rotary drive mechanism
4 hopper
5 die
5*a*, 5*b* die member
6 operation panel
7 display unit
8 input unit
9 control unit
10 calculation unit
11 storage unit
12 pellet manufacturing system
13 cooling bath
14 cutting machine
15 strand
16 pellets
17 screw
21 hole
22 resin flow path portion
23 opening
31 pressure measurement unit
32 breaker plate
33 screen mesh

The invention claimed is:

1. An extruder comprising:
a cylinder;
a die attached to the cylinder;
a resin flow path portion which is provided in the die and to which a molten resin is supplied from the cylinder;
a plurality of holes which are provided in the die and connected to the resin flow path portion and from which the molten resin is discharged;
a pressure measurement unit configured to measure a pressure of the molten resin in the die; and
a calculation unit configured to calculate a viscosity of the molten resin based on a measured value of the pressure measurement unit,
wherein the die includes a die main body portion in which the plurality of holes are formed and a die holder portion configured to hold the die main body portion, wherein the resin flow path portion is formed across the die holder portion and the die main body portion, wherein the pressure measurement unit is arranged in the die main body portion and measures the pressure of the molten resin flowing through the resin flow path portion in the die main body portion, and wherein resin pellets are manufactured by using the molten resin discharged from the plurality of holes.

2. The extruder according to claim 1, wherein a member having a plurality of openings through which the molten resin can pass is arranged on an upstream side of the plurality of holes, and wherein the pressure measurement unit measures the pressure of the molten resin on a downstream side of the member and on an upstream side of the hole.

3. The extruder according to claim 2, wherein the member is arranged between the cylinder and the die.

4. The extruder according to claim 2, wherein the member includes a breaker plate.

5. The extruder according to claim 2, wherein the member includes a screen mesh.

6. The extruder according to claim 1 further comprising:

a display unit configured to display the viscosity calculated by the calculation unit.

7. The extruder according to claim 6 further comprising:

a storage unit configured to store the viscosity calculated by the calculation unit.

8. The extruder according to claim 1, wherein the pressure measurement unit includes a pressure sensor.

9. A method of manufacturing a resin product comprising steps of:

(a) preparing an extruder including:
 a cylinder;
 a die attached to the cylinder;
 a pressure measurement unit arranged in the die; and
 a calculation unit;

(b) supplying a resin material into the cylinder to form a molten resin and discharging the molten resin from a plurality of holes of the die;

(c) manufacturing resin pellets by using the molten resin discharged from the plurality of holes;

(d) measuring a pressure of the molten resin in the die by the pressure measurement unit; and (e) calculating a viscosity of the molten resin by the calculation unit based on the pressure of the molten resin measured in step (d), wherein the die includes a die main body portion in which the plurality of holes are formed and a die holder portion configured to hold the die main body portion, wherein a resin flow path portion to which the molten resin is supplied from the cylinder is formed across the die holder portion and the die main body portion, wherein the plurality of holes are connected to the resin flow path portion, wherein the pressure measurement unit is arranged in the die main body portion, and wherein in the step (d), the pressure measurement unit measures the pressure of the molten resin flowing through the resin flow path portion in the die main body portion.

10. The method of manufacturing a resin product according to claim 9 further comprising a step of:

(f) displaying the viscosity of the molten resin calculated in the step (e) on a display unit.

11. The method of manufacturing a resin product according to claim 9, wherein the extruder further includes a member having a plurality of openings through which the molten resin can pass and arranged on an upstream side of the plurality of holes, and wherein the pressure measurement unit measures the pressure of the molten resin on a downstream side of the member and on an upstream side of the plurality of holes.

\* \* \* \* \*